United States Patent
Wilson et al.

(10) Patent No.: US 9,544,331 B2
(45) Date of Patent: Jan. 10, 2017

(54) METHOD AND SYSTEM FOR CONTROLLING ACCESS TO SHARED DEVICES

(71) Applicant: Aruba Networks, Inc., Sunnyvale, CA (US)

(72) Inventors: David Lee Wilson, Sunnyvale, CA (US); Sandip Kumar Devnath, Bangalore (IN); Anandakrishnan Viswanathan, Bangalore (IN); Santashil Palchaudhuri, West Bengal (IN); Sudeepto Kumar Roy, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 400 days.

(21) Appl. No.: 14/068,802

(22) Filed: Oct. 31, 2013

(65) Prior Publication Data

US 2015/0120951 A1 Apr. 30, 2015

(51) Int. Cl.
*H04L 29/06* (2006.01)
*H04L 12/26* (2006.01)
*H04L 29/08* (2006.01)
*G06F 3/12* (2006.01)

(52) U.S. Cl.
CPC .............. *H04L 63/20* (2013.01); *H04L 43/08* (2013.01); *H04L 43/0817* (2013.01); *H04L 43/16* (2013.01); *H04L 67/1008* (2013.01); *H04L 67/1044* (2013.01); *G06F 3/121* (2013.01); *G06F 3/1205* (2013.01); *G06F 3/1232* (2013.01); *G06F 3/1296* (2013.01); *H04L 43/10* (2013.01)

(58) Field of Classification Search
CPC ........ H04L 29/06; H04L 67/025; H04L 67/16; H04L 63/0428; H04L 63/108; G06F 13/18; G06F 21/606; H04W 4/00; H04W 8/005; H04W 84/22; H04W 40/04; H04W 72/12; G11C 8/16; H04N 21/4126; H04N 21/43637; H04N 21/6175
See application file for complete search history.

(56) References Cited

U.S. PATENT DOCUMENTS

| | | | | |
|---|---|---|---|---|
| 8,379,572 B1 * | 2/2013 | Hayes | ................... | H04W 8/265 370/328 |
| 2008/0034068 A1 * | 2/2008 | Vaughan | ................ | G06Q 10/06 709/220 |
| 2009/0049518 A1 * | 2/2009 | Roman | ............... | H04L 41/0893 726/1 |
| 2009/0083374 A1 * | 3/2009 | Saint Clair | ............ | G05B 15/00 709/203 |
| 2009/0116393 A1 * | 5/2009 | Hughes | ................. | H04L 45/122 370/238 |

(Continued)

*Primary Examiner* — Sargon Nano
(74) *Attorney, Agent, or Firm* — Brooks, Cameron & Huebsch, PLLC

(57) ABSTRACT

A non-transitory computer readable medium includes computer readable program code including instructions for subsequent to a client device associating with an access point, receiving a request for a set of allowed shared devices, removing, by the access point and to obtain the set of allowed shared devices, a shared device from a set of shared devices based on a client device user of the client device failing to have a permission required by a device sharing policy of the shared device, and transmitting the set of allowed shared devices to the client device.

8 Claims, 4 Drawing Sheets

(56) References Cited

U.S. PATENT DOCUMENTS

| | | | |
|---|---|---|---|
| 2009/0157970 A1* | 6/2009 | Kornegay | G06F 12/084 711/130 |
| 2010/0022231 A1* | 1/2010 | Heins | H04M 3/4872 455/418 |
| 2010/0150027 A1* | 6/2010 | Atwal | H04W 16/18 370/254 |
| 2011/0117852 A1* | 5/2011 | Copeland | H04W 48/08 455/62 |
| 2011/0164527 A1* | 7/2011 | Mishra | H04L 45/123 370/252 |
| 2011/0208822 A1* | 8/2011 | Rathod | G06Q 30/02 709/206 |
| 2011/0258326 A1* | 10/2011 | Hu | H04L 63/062 709/226 |
| 2012/0127977 A1* | 5/2012 | Copeland | H04L 1/0015 370/338 |
| 2012/0166642 A1* | 6/2012 | Saint Clair | H04L 67/125 709/225 |
| 2013/0111039 A1* | 5/2013 | Gomes | H04W 4/023 709/227 |
| 2013/0166635 A1* | 6/2013 | Pyo | H04L 67/42 709/203 |
| 2013/0195112 A1* | 8/2013 | Morita | H04L 41/28 370/400 |
| 2013/0229929 A1* | 9/2013 | Linsky | H04W 8/18 370/252 |

* cited by examiner

METHOD AND SYSTEM FOR CONTROLLING ACCESS TO SHARED DEVICES

BACKGROUND

Computer networks allow users to connect to other users and to various services. For example, a client device may request a service, on behalf of a user, from a shared device that is shared amongst multiple users and multiple client devices. The service may be to provide content and/or to perform an action. In order to request a service from a particular shared device, a determination may be made as to which shared devices are available to the client device.

OVERVIEW

In general, in one aspect, embodiments relate to a non-transitory computer readable medium that includes computer readable program code including instructions for subsequent to a client device associating with an access point, receiving a request for a set of allowed shared devices, removing, by the access point and to obtain the set of allowed shared devices, a shared device from a set of shared devices based on a client device user of the client device failing to have a permission required by a device sharing policy of the shared device, and transmitting the set of allowed shared devices to the client device.

In general, in one aspect, embodiments relate to a non-transitory computer readable medium that includes computer readable program code including instructions for obtaining a current user priority of each current user using a shared device in a set of shared devices, subsequent to a client device associating with an access point, obtaining a client device user priority of a client device user of the client device, removing, to obtain set of allowed shared devices, a first shared device from the set of shared devices based on the client device user priority being less than the current user priority of at least one current user of the first shared device, and transmitting the set of allowed shared devices to the client device.

In general, in one aspect, embodiments relate to a non-transitory computer readable medium that includes computer readable program code including instructions for subsequent to a client device associating with an access point, identifying a location of the access point, removing, to obtain a set of allowed shared devices, the shared device from a set of shared devices based on a location of the shared device in relation to the location of the access point, and transmitting the set of allowed shared devices to the client device.

Other aspects will be apparent from the following description and the appended claims.

DETAILED DESCRIPTION

Figure 1:
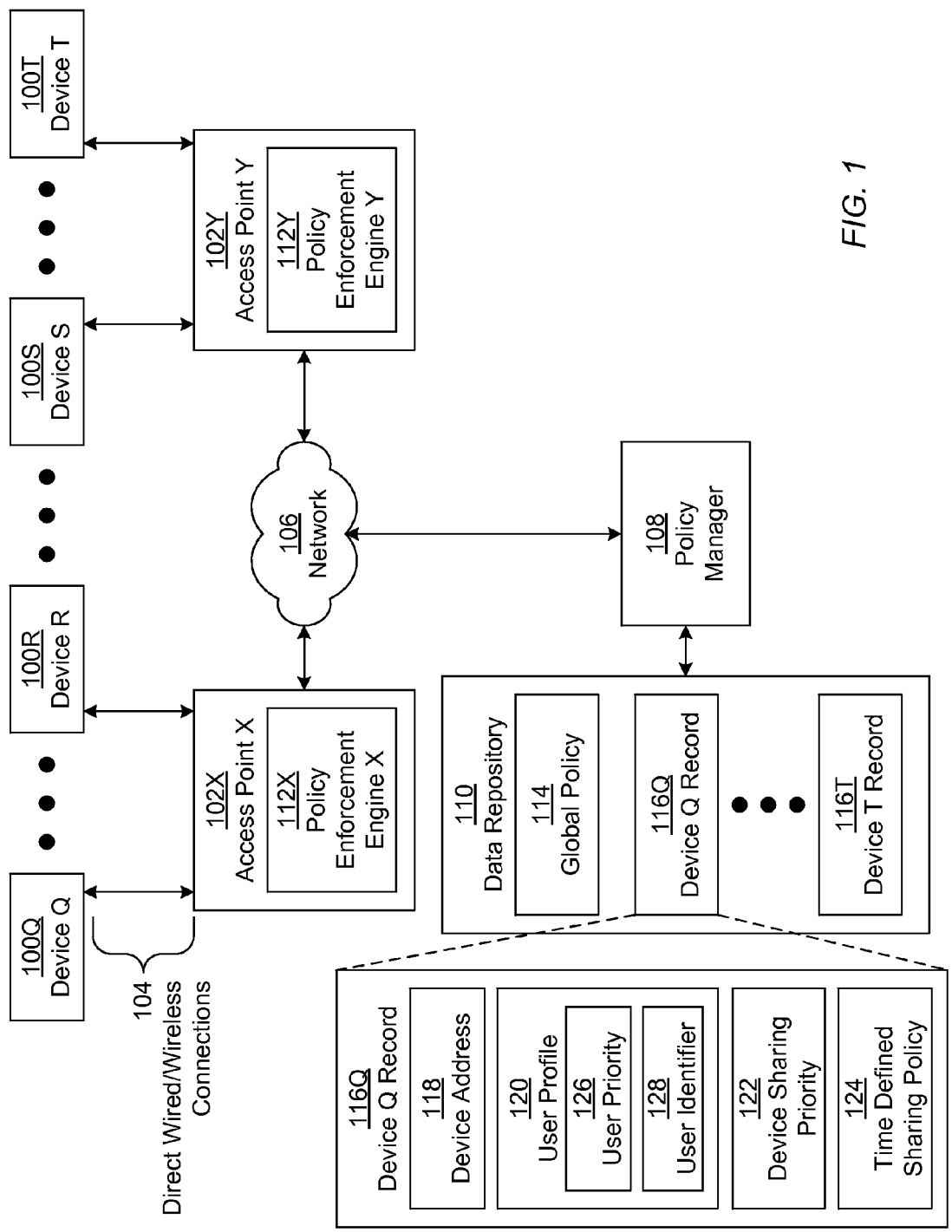
FIG. 1 shows a schematic diagram of a system in accordance with one or more embodiments.

Specific embodiments will now be described in detail with reference to the accompanying figures. Like elements in the various figures are denoted by like reference numerals for consistency. In the figures, three co-linear dots indicate that additional items of similar type to the preceding and succeeding items with respect to the dots may optionally exist.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

As used herein, a user refers to a person, department, business entity, organization, or other group that is responsible for a device. For example, a user may own or lease a device. By way of some example users, a user may be an Information Technology (IT) department. A client device user is a user who is responsible for a client device. A shared device user is a user who is responsible for a shared device. By way of an example, through the client device, a client device user may use the services of a shared device, which is owned by an IT department. In the example, the shared device user is the IT department. Additionally, a user is deemed to perform an action when an individual, group, or hardware device performs an action on behalf of the user in one or more embodiments.

In general, embodiments provide a method, system, and computer readable medium for presenting shared devices. Specifically, one or more embodiments identify a set of allowed shared devices that may be used by a user of a client device and present the set to the client device. In one or more embodiments, the set of allowed shared devices may be based on whether the user has permission to use the shared device, the user priority of the user as compared to the user priority of current users of the shared device, the access point to which the shared device is connected, other factors, or a combination thereof.

FIG. 1 shows a schematic diagram of a system in accordance with one or more embodiments. As shown in FIG. 1, the system includes devices (e.g., device Q (100Q), device R (100R), device S (100S), device T (100T)), access points (e.g., access point X (102X), access point Y (102Y)), a network (106), a policy manager (108), and a data repository (110). Each of these components is discussed below in accordance with one or more embodiments.

In one or more embodiments, a device (e.g., device Q (100Q), device R (100R), device S (100S), device T (100T)) is a hardware component that receives a service from another device of the system and/or provides a service to another device of the system. Specifically, when the device receives a service, the device may be referred to as a client device with respect to the service. When a device provides a service, the device may be referred to as a shared device with respect to the service. A shared device is a device that provides services to at least one client device. If the shared device provides services to multiple client devices, the services may or may not be provided at the same time. In one or more embodiments, each particular device (e.g., device Q (100Q), device R (100R), device S (100S), device T (100T)) in FIG. 1 may be a client device and a non-shared device, a shared device and a non-client device, or both a client device and a shared device.

In one or more embodiments, a device (e.g., device Q (100Q), device R (100R), device S (100S), device T (100T)) may be one or more mobile devices (e.g., laptop computer, smart phone, personal digital assistant, tablet computer, or other mobile device), gaming console, desktop computers, servers, blades in a server chassis, or any other type of electronic device or devices that includes at least the minimum processing power, memory, and input and output device(s) to perform one or more embodiments. For example, the device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The device may also include one or more input device(s), such as a touchscreen, keyboard, mouse, microphone, touchpad, electronic pen, or any other type of input device. Further, the device may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely (e.g., via the network) connected to the hardware processor(s), memory, and storage device(s). Many different types of devices exist, and the aforementioned input and output device(s) may take other forms.

The device may be connected to a network (106) via a network interface connection (not shown) and an access point (e.g., access point X (102X), access point Y (102Y)). The network (106) may be a local area network (LAN), a wide area network (WAN) such as the Internet, mobile network, or any other type of network, or a combination of networks.

An access point (e.g., access point X (102X), access point Y (102Y)) is a digital hardware device that may be communicatively coupled to the network (106). The access point (e.g., access point X (102X), access point Y (102Y)) is a separate hardware unit from device (e.g., device Q (100Q), device R (100R), device S (100S), device T (100T)), that is directly, wired or wirelessly, connected to the device and is in a communication path from the device to the network. In other words, the access point may be directly connected via the direct wired/wireless connection (104) to a network interface card on the device (e.g., device Q (100Q), device R (100R), device S (100S), device T (100T)). Further, access points may be directly connected to the network (106) or connected via a controller. By way of an example, the access point may include a wireless access point (WAP) that communicates wirelessly with devices using Wi-Fi, Bluetooth or related standards and that communicates with a wired network.

Each access point may be connected to any number of devices at any moment in time. Specifically, each access point may be connected to no devices, a single device, or multiple devices at any particular moment in time. Further, the number of devices connected to an access point may be heterogeneous amongst access points.

One or more of the access points may include a policy enforcement engine (e.g., policy enforcement engine X (112X), policy enforcement engine Y (112Y)). In one or more embodiments, a policy enforcement engine (e.g., policy enforcement engine X (112X), policy enforcement engine Y (112Y)) is hardware, software, firmware, or a combination thereof that includes functionality to enforce policies (e.g., time defined sharing policy (124) (discussed below), global policies (114) (discussed below)). In one or more embodiments, the policy enforcement engine may include functionality to obtain a shared policy and/or a global policy, make a decision whether a client device may use a particular shared device based on the shared policy and/or global policy, and deny access and/or not expose the shared device to the client device based on the decision. Alternatively or additionally, the policy enforcement engine may include functionality to obtain, from a cache (not shown) on the access point, a cached decision indicating whether the client may use a particular shared device and deny access and/or not expose the shared device to the client device based on the decision.

Continuing with FIG. 1, the access points (e.g., access point X (102X), access point Y (102Y)) may be operatively connected, continuously or intermittently, directly or via the network, to a policy manager (108). The policy manager (108) may correspond to a computing system or execute on a computing system and cause the computing system to manage policies (e.g., global policies (114), time defined sharing policy (124)). Managing policies may include receiving new policies, deleting old policies, ensuring that policies on the access points are current, transmitting policies and/or decisions to the access points (e.g., access point X (102X), access point Y (102Y)), associating users with policies, and performing other actions.

The computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, the computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system may be connected to a network (106) (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage device(s). Many different types of computing systems exist, and the aforementioned input and output device(s) may take other forms. Further, one or more elements of the aforementioned computing system may be located at a remote location and connected to the other elements over a network.

Continuing with FIG. 1, the policy manager (108) is connected to a data repository (110). In one or more embodiments, the data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site. Further, the data repository may be or may execute on the same computing system as policy manager (108). Alternatively or additionally, the data repository (110) may be on a separate computing system.

The data repository (110) includes functionality to store global policies (114) and device records (e.g., device Q record (116Q), device T record (116T)) for each device connected to an access point (e.g., access point X (102X), access point Y (102Y)) in the system. A global policy (114) is a policy that applies to all devices. For example, a global policy (114) may be to enforce an ordering of the shared devices when presented to a user, that the shared devices are to be filtered based on location of the access point directly connected to the client device, and other such policies.

A device record (e.g., device Q record (116Q), device T record (116T)) is information about a device. Any mechanism may be used to store a device record without departing from the scope of the claims. In particular, a device record may be a file, a database record, an entry or row in a table, or another data structure.

FIG. 1 shows an expanded view of device Q record (116Q) in one or more embodiments. The same or similar record may exist for the various other devices in the system. As used herein a device record includes data when the data is directly in the storage structure of the device record or when the device record directly or indirectly links to the data.

As shown in FIG. 1, device Q record (104) may include a device address (118), a user profile (120), a device sharing priority (122), and a time defined sharing policy (124) in accordance with one or more embodiments. Each of these components is discussed below.

A device address (118) is a unique identifier for a device. For example, the device address may be a media access control (MAC) address, a serial number of the device, or another unique identifier of the device.

In one or more embodiments, the user profile (120) corresponds to information about a user of the device. A user profile (120) may include a user identifier (128) and a user priority (126). A user identifier (128) is a unique identifier of a user. The user identifier (128) may be a single piece of identification (e.g., tax identifier, login name, email address, a system assigned unique identifier) or combination of identifiers (e.g., combination of mailing address and name, combination of name and birthdate, or other combination). A user priority is a value that defines the rank of the client device user. For example, when device Q record (116Q) is for device acting in the role of a client device, the user priority defines the rank of the client device user with respect to other client device users when requesting access to one or more shared devices. Thus, the user priority defines an importance of a client device user using services of a shared device as compared to other client device users using services from a shared device. In one or more embodiments, the user priority may be an independently defined value on a scale. For example, each user may be assigned a value from one to ten irrespective of the value assigned to other users. In one or more embodiments, the user priority may be a relative ranked value of the user with respect to other users. In other words, the users may be ordered and a value assigned to the user that defines the position of the user with respect to the order.

Continuing with FIG. 1, in one or more embodiments, a device sharing priority (122) is a priority assigned to a device. In one or more embodiments, the device sharing priority (122) defines a rank of the shared device with respect to other devices. The device sharing priority is defined based on whether a service of the particular shared device is to be preferred over other devices. For example, shared devices in a conference room may be assigned a higher device sharing priority value than shared devices in individual offices. Further, shared devices of individual users may be assigned a lower device sharing priority value than shared devices belonging to the IT department. In one or more embodiments, the device sharing priority is globally defined. In other words, the device sharing priority is defined independently of the access to the device. Thus, the device sharing priority for a shared device does not depend on the user, location of the client device, or client device accessing the shared device. Similar to the user priority (126), the device sharing priority (122) may be independently defined on a scale with respect to other shared devices or may be defined relative to other shared devices.

In one or more embodiments, the time defined sharing policy (124) is a sharing policy that is dependent on time. A sharing policy may specify a collection of users that may use the shared device, a collection of client devices that may use the shared device, respective access rights that each user or client device may have with respect to using the client device, and other permissions required to use the shared device. In one or more embodiments, the time defined sharing policy (124) may specify a start time and an expiration time for the time defined sharing policy. The start time is the time in which the time defined sharing policy begins to be effective. The expiration time is the ending time in which the time defined sharing policy stops being effective. Various mechanisms may be used to specify the start time and/or expiration time. For example, the start time and/or expiration time may be defined relative to an event (e.g., start of business day, a user logging in, conference times, or another event), defined in absolute values, defined relative to the expiration time or the start time, or defined using another technique. Further, the times may be defined as recurring or at a single moment. The same device may have multiple time-defined sharing policies. For example, one time defined sharing policy may be for the shared device user and another time defined sharing policy may exist for client device users that may use the shared device. Other sharing policies that are not time defined may exist and be enforced without departing from the scope of the claims.

In one or more embodiments, one or more of the components of the device record may be omitted when the device is non-shared or non-client device. For example, if the device is non-client device, then the device may omit a user priority. By way of another example, if the device is non-shared device, the device may omit the device sharing priority and the time defined sharing policy in accordance with one or more embodiments.

Although not shown in FIG. 1, software instructions in the form of computer readable program code to perform embodiments may be stored, in whole or in part, temporarily or permanently, on a non-transitory computer readable medium, such as a CD, DVD, storage device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the access point (e.g., access point X (102X), access point Y (102Y)), the policy manager (108), the data repository (e.g., device Q (100Q), device R (100R), device S (100S), device T (100T)), and/or another component.

While FIG. 1 shows a configuration of components, other configurations may be used without departing from the scope of the claims. For example, various components may be combined to create a single component. As another example, the functionality performed by a single component may be performed by two or more components.

FIGS. 2-5 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

Figure 2:
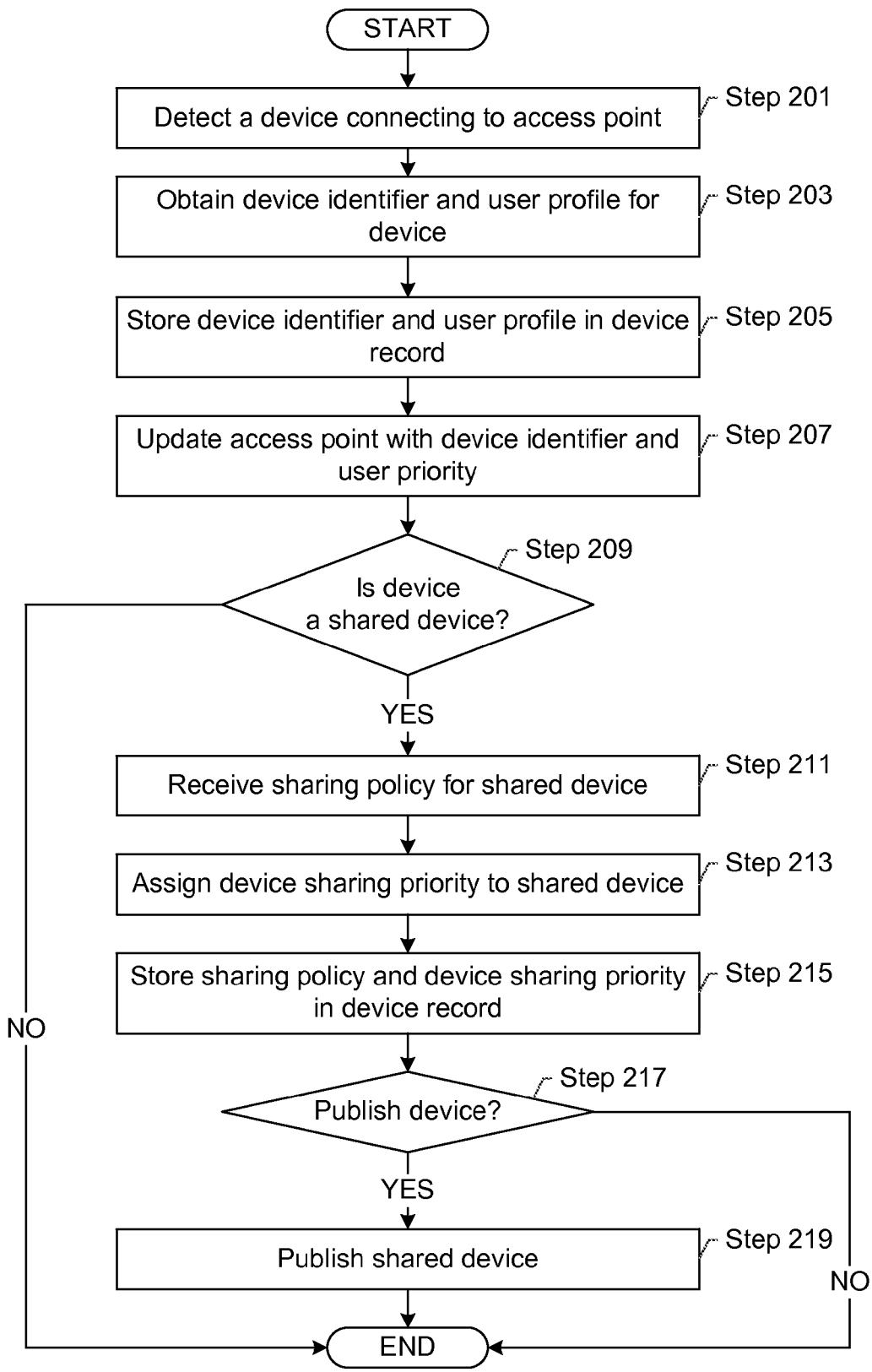
FIGS. 2-5 show flowcharts in accordance with one or more embodiments.

Turning to FIG. 2, FIG. 2 shows a flowchart for adding a new shared device to the system in accordance with one or more embodiments. In Step 201, a device connecting to an access point is detected in accordance with one or more embodiments. In one or more embodiments, the device establishes a direct connection to the access point. As part of establishing the connection, the access point may determine, such as based on the MAC address of the device, that the device is a new device. A new device may be a device that does not have a device record stored in the data repository. In one or more embodiments, determining that the device is a new device may include the access point checking a data repository located on the access point for the device, and, if not found, sending a request to the policy manager to determine whether any device record exists for the device. If no device record exists, then the device may be deemed a new device. Step 201 may be omitted, for example, if a device record is manually created for the device prior to a first access by the device to any access point.

In Step 203, a device identifier and a user profile are obtained for the device. In one or more embodiments, the device identifier may be submitted by a user using a user interface, such as a user interface of the policy manager or access point. Alternatively, the device identifier may be obtained from the device. In one or more embodiments, the user profile may be obtained from a user using a user interface. For example, if the user is associated with another existing device, the user profile may already be in the data repository and an identifier of the user profile is obtained. In the example, the identifier of the user profile may be obtained from the user in one or more embodiments. By way of another example, if the user is not associated with another device, the user may register with the system. Registration may include the user providing administrative information (e.g., name, address, user identifier, role or job title of the user), and any other information. Alternatively, an administrator or other individual may submit all or part of the administrative information for the user. The user and/or other individual may submit the user profile using the device or another device connected to the system.

In one or more embodiments, if the device is a client device, the user may be assigned a user priority. The user priority may be assigned based on any of a number of properties of the user, such as the role or job title of the user, information about the projects with which the user is associated, and other information.

In Step 205, the device identifier and the user profile are stored in a device record. In one or more embodiments, an existing device record may be modified or a new device record may be created with the device identifier and user profile. In Step 205, the storage may be performed by the access point and transmitted to the data repository. In one or more embodiments, the storage may be performed by the policy manager.

In Step 207, the access point is updated with the device identifier and user priority. Specifically, if the access point does not have the device identifier and user priority, then the device identifier and user priority may be sent to the access point. Accordingly, the access point may update local memory to include the device identifier and/or user priority.

In Step 209, a determination is made whether the device is a shared device in accordance with one or more embodiments. In one or more embodiments, determining whether the device is a shared device may be based on default (e.g., all devices are shared devices), the type of device, input from a user or other individual via a user interface, or by another mechanism.

In Step 211, if the device is a shared device, a sharing policy is received for the shared device in accordance with one or more embodiments. For example, the user may submit parameters of the sharing policy to the policy manager. The parameters may include the permissions required by the client device users to use the shared device, times in which the sharing policy is effective, access limitations to using the shared device, and other limitations.

In Step 213, a device sharing priority is assigned to the shared device. The device sharing priority may be assigned by an administrator and/or as a default value. For example, the device sharing priority may be assigned based on the location of the device, the shared device user, the type of device, and other information.

In Step 215, the sharing policy and device sharing priority are stored in the device record in accordance with one or more embodiments. Specifically, the sharing policy and device sharing priority may be transmitted to the data repository.

In Step 217, a determination is made whether to publish the device in accordance with one or more embodiments. In one or more embodiments, the shared device is published when a sharing policy is effective for the device and permits the shared device to be shared by another client device.

If a determination is made to publish the shared device, then the shared device is published in Step 219. In one or more embodiments, publishing includes transmitting information about the shared device to access points for enforcement. Publishing the shared device may be performed as discussed below with reference to FIG. 4.

Figure 3:
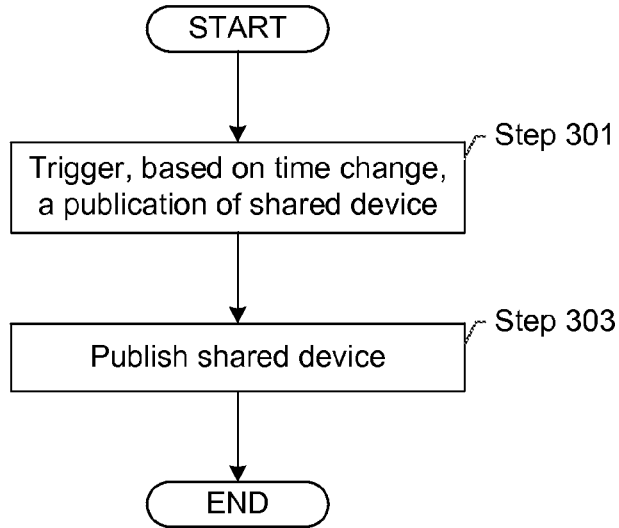

Continuing with FIG. 2, when a device record for the shared device is stored in the data repository, the data repository, policy manager, access points, or other unit or combination thereof may monitor the shared device policies to ensure that the sharing policies that are used are current. FIG. 3 shows a flowchart for updating in one or more embodiments. In Step 301, based on a time change, a publication of the shared device is triggered. For example, the data repository may include a trigger defined for a sharing policy that initiates a publication request when the start time or expiration time of the sharing policy occurs. By way of another example, when the access point attempts to enforce a sharing policy, the access point may detect that the sharing policy is no longer effective and request a new sharing policy from the policy manager. Other mechanisms may be used to detect a sharing policy without departing from the scope of the claims.

In Step 303, the shared device is published in accordance with one or more embodiments. In one or more embodiments, publishing the shared device may include transmitting a current sharing policy to the access points in accordance with one or more embodiments.

Figure 4:
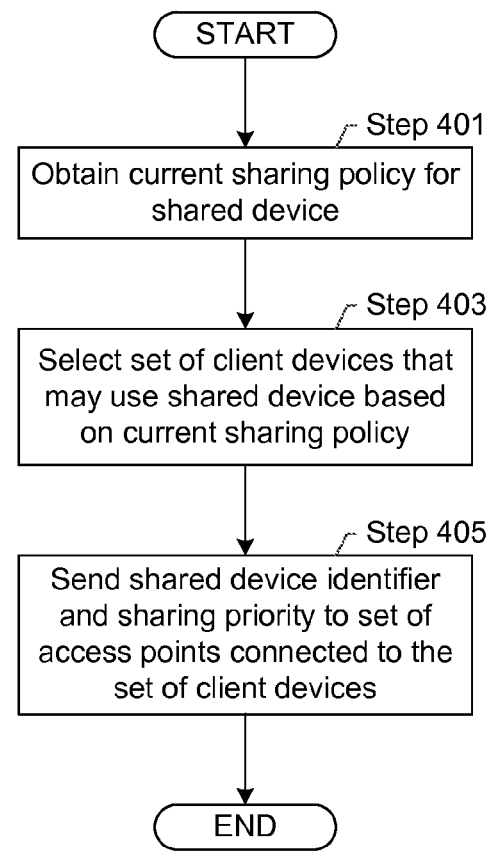

FIG. 4 shows a flowchart for publishing a shared device in accordance with one or more embodiments. In Step 401, a current sharing policy is obtained for the shared device in accordance with one or more embodiments. The current sharing policy may be obtained from the data repository. If multiple sharing policies are current, then multiple sharing policies may be obtained in Step 401.

In Step 403, a set of client devices that may use the shared device are selected based on the current sharing policy. In one or more embodiments, the client devices may be selected from the set of client devices that are currently connected to an access point or the set of all client devices in the data repository. In one or more embodiments, selecting the client devices may be performed by selecting properties of the client devices, such as the role of the client device users or other properties, or selecting the addresses of the client devices.

In one or more embodiments, the set of access points which are connected to the set of client devices may be identified. Identifying the set of access points may be performed by querying the access points and/or querying the data repository to identify to which client device each access point is connected or to which access point each client device is connected.

In Step 405, the shared device identifier and sharing priority is sent to the set of access points, which are connected to the set of client devices. For example, the shared device identifier and the sharing priority may be sent with the client device identifier via the direct or network connection to the access points. In one or more embodiments, Step 405 may be performed by sending the sharing policy to the identified access points. Alternatively or additionally, Step 405 may be performed by transmitting input(s) and resulting decisions to the access points. For example, the input(s) may be the client device, the shared device identifier, the type of access requested, and other inputs. The resulting decision may be to allow or deny access. Rather than selecting the client devices that are connected to the access points, publishing the shared device may be to send the sharing policy and the device sharing priority to all access points.

Other techniques for publishing the shared device may be performed without departing from the scope of the claims.

Figure 5:
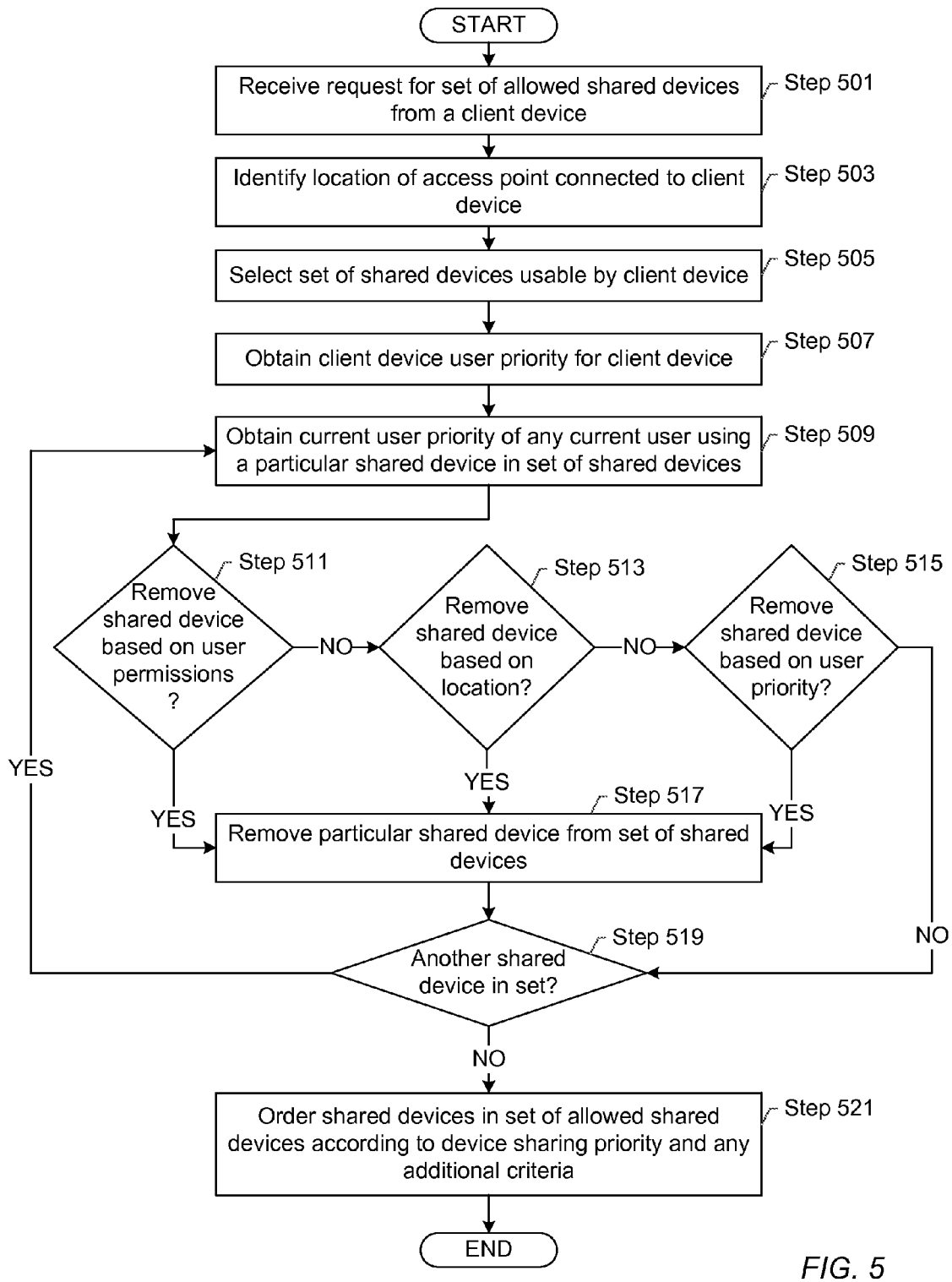

FIG. 5 shows a flowchart for presenting shared devices to a client device in accordance with one or more embodiments. In Step 501, a request for a set of allowed shared devices is received from a client device in accordance with one or more embodiments. For example, the client device may associate with an access point. Subsequent to the association, such as after or as a part of the association, the request for shared devices may be received. The request may be for all shared devices. Alternatively, the request may be for a subset of shared devices, such as shared devices having certain properties or offering particular services.

In Step 503, the location of the access point connected to the client device may be identified in accordance with one or more embodiments. Identifying the location may be performed by identifying the access point, obtaining a geographic location identifier, such as coordinates, room identifier, or other geographic location identifier, or obtaining another identifier of the access point in accordance with one or more embodiments.

In Step 505, a set of shared devices usable by the client device is selected in accordance with one or more embodiments. In one or more embodiments, the set of shared devices may be all shared devices or shared devices satisfying initial filtering criteria. For example, the set of shared devices may be shared devices that satisfy preliminary location criteria (e.g., in the same building as the access point, on the same floor as the access point, or other preliminary criteria), offer the services requested by the client in the request, or other filtering criteria.

In one or more embodiments, the access point may obtain the set of shared devices. For example, the access point may access local memory, such as a memory device in the access point or physically and directly connected to the access point, to obtain the set of shared devices. Alternatively or additionally, the access point may send a request to the data repository for the set of shared devices. Other components of the system may obtain the set of shared devices without departing from the scope of the claims.

In one or more embodiments, a client device user priority for the client device is obtained in Step 507. In one or more embodiments, the access point may obtain the client device user priority from the client device, from the data repository, or from another component.

In one or more embodiments, the access point, or another component, further filters the set of shared devices on a shared device by shared device basis. Thus, Steps 509-517 of FIG. 5 are described for a particular shared device. Steps 509-517 may be performed in parallel for multiple shared devices and/or for multiple layers of filtering.

In Step 509, the current user priority of any current user of the particular shared device in the set of shared devices is obtained. In one or more embodiments, the current user priority may be obtained by identifying the current client devices that are accessing the shared device. Based on the current client devices, the current user priority may be identified. If multiple current client devices are accessing the shared device, then the current user priority may be a running statistic of the user priority, a recalculated statistic, a value for each current client device, or combination thereof. For example, the statistic may be maximum, mean, median, or another statistic, or combination thereof. The current user priority may be periodically updated to the access point, obtained from the data repository, or obtained from another component. If the current user priority is periodically updated, the access point may obtain the current user priority directly from local memory.

In Step 511, a determination is made whether to remove the shared device based on user permissions in one or more embodiments. For example, a determination may be made whether the user has the permissions required by the sharing policy defined for the shared device. The permissions may require that the user is a particular user, has a particular role (e.g., administrator, officer, employee), is in a defined group (e.g., a user-defined group, or other group), or has another attribute. Determining whether the user has the permissions may be performed by comparing the user profile of the client device user with the sharing policy of the shared device. In one or more embodiments, the user profile of the client device user and the sharing policy of the shared device are stored at the access point. Thus, the access point may make the determination. Alternatively or additionally, the decision for the client device user and sharing policy may be stored in local memory at the access point. In such embodiments, the access point may make the determination by using the decision. Other components may make the determination without departing from the scope of the claims.

If a determination is made to remove the shared device, then the shared device is removed in Step 517 in accordance with one or more embodiments. In one or more embodiments, removing the shared device may be to not add the shared device to the set of allowed shared devices or to delist the shared device from the set of shared devices.

Returning to Step 511, if a determination is made not to remove the shared device based on user permission, a determination may be made to remove the shared device based on other reasons. In Step 511, a determination is made whether to remove the shared device based on location. Specifically, a determination is made based on the access point to which the client device is connected. In one or more embodiments, a global sharing policy may be used to determine whether to remove the shared device. The global sharing policy may be defined for the access point, for a subset of access points, or for all access points. For example, the global sharing policy may specify that only shared devices located in the same room as the access point may be used by a client device. Thus, a client device connected to an access point in a conference room may not use shared devices outside of the conference room. By way of another example, the sharing policy may specify that shared devices satisfying certain criteria, such as service provided, may only be used by client devices connected to access points in a predefined region. By way of an example, if the client device is requesting a projector service, the client device connected to an access point in a classroom may only see the projector in the classroom.

In one or more embodiments, the determination may be performed by identifying the location of the shared device, such as based on geographic coordinates or the access point, and comparing the location with the location of the access point to which the client device is connected. Further, the determination may be made by the access point or by another component.

If a determination is made to remove the shared device based on location, then the shared device is removed in Step 517. If a determination is made not to remove the shared device based on location, then another reason may exist to remove the shared device. For example, in Step 515, a determination is made whether to remove the shared device based on user priority. Specifically, a determination is made based on comparing the current user priority of the shared device to the client device user priority. If the client device user priority is greater than the current user priority, then the client device may use the shared device in accordance with one or more embodiments. Using the shared device may include halting other client devices from using the shared device. If the client device user priority is less than the current user priority, then the shared device may be removed. Alternatively or additionally, further determination may be made as to the number of current users or other factors as to whether to remove the shared device when the client device user priority is less than the current user priority.

In one or more embodiments, a sharing policy may be used to determine whether to remove the shared device. The sharing policy may be a global sharing policy or a shared device sharing policy. In one or more embodiments, the determination may be performed by the access point or by another component.

If a determination is made to remove the shared device based on location, then the shared device is removed in Step 517. If a determination is made not to remove the shared device based on location, then another reason may exist to remove the shared device. Alternatively, another reason may not exist to remove the shared device. In such a scenario, the shared device may remain in the set or added to the set of allowed shared devices.

In Step 519, a determination is made whether another unprocessed shared device exists in the set. If another unprocessed shared device exists, then the method may proceed to Step 509 to process the next shared device in accordance with one or more embodiments. If another unprocessed shared device does not exist, then the remaining shared devices are a set of allowed shared devices. The set of allowed shared devices may include no devices, a single device, or multiple devices.

In Step 521, the shared devices in the set of allowed shared devices are ordered according to device sharing priority and any additional criteria in accordance with one or more embodiments. In one or more embodiments, the device sharing priority is obtained from the data repository or from local memory for each shared device in the set of shared devices. In addition to the device sharing priority, additional criteria, such as location, may be used as a first or second layer of ordering. In one or more embodiments, higher priority shared devices are presented to the client device, and, optionally, to the user, prior to lower priority shared devices. For example, the higher priority shared devices may be presented in a list above the lower priority shared devices, or temporally before the lower priority shared devices. In one or more embodiments, the ordered set is transmitted to the client device as part of the presenting. Alternatively or additionally, the client device may order the shared devices.

The following example is for explanatory purposes only and not intended to limit the scope of the claims. In the following example, consider the scenario in which a business is hosting a conference in multiple conference rooms. In the conference, attendees may connect to the network and printers, presenters may control individual displays and consoles of the room in which the presenter is located and may connect to any printer, and conference organizers may control everything. Further, the conference organizer has a higher priority than presenters who have a higher priority than attendees. Additionally, in the example, displays have the highest sharing priority, then printers, then consoles.

Continuing with the example, when an attendee's laptop computer enters conference room "B", the attendee's laptop computer connects to a local access point in conference room "B". A record is created for the attendee's laptop computer that has the lowest user priority. Based on the attendee's laptop computer being connected to local access point in conference room "B", the attendee may print to the local printer in conference room "B" and to no other printer. Further, the attendee's laptop computer is not presented with any display, or other printers.

In the example, when a presenter's tablet enters conference room "B", the presenter's tablet connects to a local access point in conference room "B". A record is created for the presenter's tablet that has a medium user priority. Based on the presenter's tablet being connected to local access point in conference room "B", the presenter's tablet may control the display in conference room "B" only, and may connect to any printer. When the presenter wants to view the possible devices for connection, based on the presenter's tablet being in conference room "B", the presenter's tablet is given a list having the display in conference room "B" first, then the printer in conference room "B", then the console in conference room "B", and then the remaining printers in order of distance to the access point to which the presenter's tablet is connected based on the location of the presenter's tablet and the shared device priority of each shared device.

When the conference organizer's smart phone connects to an access point in conference room "B", the conference organizer's smart phone has a record that specifies the highest user priority. When the conference organizer's smart phone wants to obtain the possible devices for connection, based on the conference organizer's smart phone being in conference room "B", the conference organizer's smart phone is given a list having the display in conference room "B" first, then the printer in conference room "B", then the console in conference room "B", and then the remaining displays and printers in order of distance to the access point to which the conference organizer's smart phone is connected based on the location of the conference organizer's smart phone and the shared device priority of each shared device. If the presenter's tablet is controlling the display and the conference organizer's smart phone requests connection to the same display in conference room "B", the conference organizer's smart phone may take over the control of the display from the presenter's tablet. In the above example, the various determinations, access control, and ordering may be performed by the access point in conference room "B" to which each device is directly and wirelessly connected.

The following example is another example for explanatory purposes only and not intended to limit the scope of the claims. In the following example, consider the scenario in which an airport has a system with access points to connect passengers, airlines, security, and other departments to a network. Several client devices exist, such as passenger devices that can access the Internet via the access points, airline gate consoles may access local public announcement (PA) devices and local displays, and security desks that may access anything. PA devices may have a higher shared device priority than local displays because PA devices may be deemed to be more frequently used. Further, the security devices may have higher priority than airline gate consoles, which have higher priority than passenger devices based on the security being more important than the airline, which is more important than passengers.

Continuing with the example, when a passenger device connects to an access point, the access point may remove any shared device that is not just for the passenger device to connect to the Internet. In other words, the access point denies the passenger device from accessing any PA system and displays.

In the example, when an airline gate console would like to know which devices are available, based on the location of the access point to which the airline gate console is connected, the access point filters non-local PA devices and non-local displays. Further, the local PA device is presented prior to the local display based on the respective shared device priorities. Thus, an airline attendant using the airline gate console may easily make announcements to passengers of the flight.

Continuing with the example, when the security device would like to know which devices are available to make an announcement, the security device is presented with all devices ordered by PA devices being first and display devices second. Based on the security device having a higher user priority than the airline gate console, the security device requesting use of the PA devices may halt the airline gate consoles from using the PA devices. In one or more embodiments, the various determinations are performed by the access points to which the security device and airline gate consoles are connected.

In one or more embodiments of the invention, requests from the client device may be a multicast domain name service (mDNS) query. Specifically, one or more embodiments of the invention have the access point handle mDNS queries from client devices without any further upstream communication. In particular, the mDNS packet is handled directly at the access point. Each access point learns and stores the relevant information from the access point's connected devices for resolving mDNS queries. The access points further share the information with the other access points in the network. Once shared, each access point has a full data repository of records for resolving mDNS queries and is capable of replying to mDNS queries on their own.

In particular, all the mDNS packets received by the access point from a device connected to the access point are sent to the software process running on the connected access point. The software process may filter out the irrelevant service/resource records from the mDNS packets. Such filtering may depend on the configuration set by the administrator. The software process then handles the mDNS packets by either storing information or responding to queries using a unicast packet response. Thus, one or more embodiments of the invention prevent mDNS query packets to burden the network or the connection between an access point and the access point's connected devices. Moreover, because mDNS query responses are from the connected access point, one or more embodiments of the invention may enforce policies by preventing the client device from learning of any restricted shared device.

One or more embodiments of the invention provide for location-based service discovery by handling mDNS queries at the connected access point. Using the inherent location information present implicitly in a swarm, client devices may be presented services only by servers in the same swarm, thereby giving a more relevant service list to a client device. In particular, mDNS queries are leaked by roamed clients on foreign swarms for localized response from the connected access point.

One or more embodiments of the invention sort shared devices based on distance when handling mDNS queries at the connected access point. The shared devices presented to a client for a particular service, are sorted based on the distance of the shared device from the client device. The mDNS response list if dynamically sorted and responses sent out serially to the client to achieve the net effect of the closer shared device showing up early in the list.

One or more embodiments of the invention filter services within same vlan by handling mDNS queries at the connected access point. Specifically, as the filtering based on role and/or vlan is done by the connected access point in the mDNS stack, and not broadcasted locally, the advanced filtering service can be done even within the same vlan in accordance with one or more embodiments of the invention.

While embodiments have been described with respect to a limited number of embodiments, those skilled in the art, having benefit of this disclosure, will appreciate that other embodiments can be devised which do not depart from the scope of the claims as disclosed herein. Accordingly, the scope of the claims should be limited only by the attached claims.

What is claimed is:

1. A non-transitory computer readable medium comprising computer readable program code comprising instructions for:
   subsequent to a client device associating with a wireless access point, receiving a request for a set of allowed shared devices;
   removing, by the wireless access point and to obtain the set of allowed shared devices, a shared device from a set of shared devices based on a client device user of the client device failing to have a permission required by a device sharing policy of the shared device;
   transmitting the set of allowed shared devices to the client device;
   receiving, by the wireless access point, from a data repository, and in response to an expiration of time of the device sharing policy of the shared device, a subsequent device sharing policy of the shared device; and
   replacing by the wireless access point, the device sharing policy of the shared device with the subsequent device sharing policy of the shared devices.

2. The non-transitory computer readable medium of claim 1, wherein the computer readable program code further comprises instructions for:
   obtaining, from a cache on the wireless access point, a cached decision of the client device user failing to have the permission required by the device sharing policy of the shared device,
   wherein the removing of the shared device is based on the cached decision.

3. The non-transitory computer readable medium of claim 1, wherein the computer readable program code further comprises instructions for:
   obtaining, by the wireless access point directly connected to the client device, the device sharing policy for each shared device in the set of shared devices and a user profile of the client device user;
   making a determination, from the user profile and the device sharing policy of the shared device, that the user fails to have the permission,
   wherein the removing of the shared device is based on the determination.

4. The non-transitory computer readable medium of claim 1, wherein the computer readable program code further comprises instructions for: detecting, by the access point, the shared device connecting to the access point; obtaining, by the access point, a device identifier for the shared device; transmitting, by the access point, the device identifier to the data repository; and receiving, by the access point, from the data repository, the previous device sharing policy specifying the expiration of time, and a perpetuous device sharing policy, wherein the perpetuous device sharing policy limits access to a limited set of users.

5. The non-transitory computer readable medium of claim 1, wherein the computer readable program code further comprises instructions for:
   obtaining, by the wireless access point, a device sharing priority for each shared device in the set of allowed shared devices; and
   ordering, by the wireless access point, the set of allowed shared devices based on the device sharing priority.

6. The non-transitory computer readable medium of claim 5, wherein the device sharing priority is a global device sharing priority assigned to the shared device for a plurality of wireless access points, wherein the wireless access point is in the plurality of wireless access points.

7. The non-transitory computer readable medium of claim 5, wherein the device sharing priority is a scaled value independently defined for each shared device.

8. The non-transitory computer readable medium of claim 1, wherein the request is from the client device and is a multicast domain name service (mDNS) query.

* * * * *